Dec. 13, 1955    J. J. BRAUND    2,726,572
METHOD OF AND APPARATUS FOR PHOTOGRAPHING
Filed Oct. 27, 1952    4 Sheets-Sheet 1
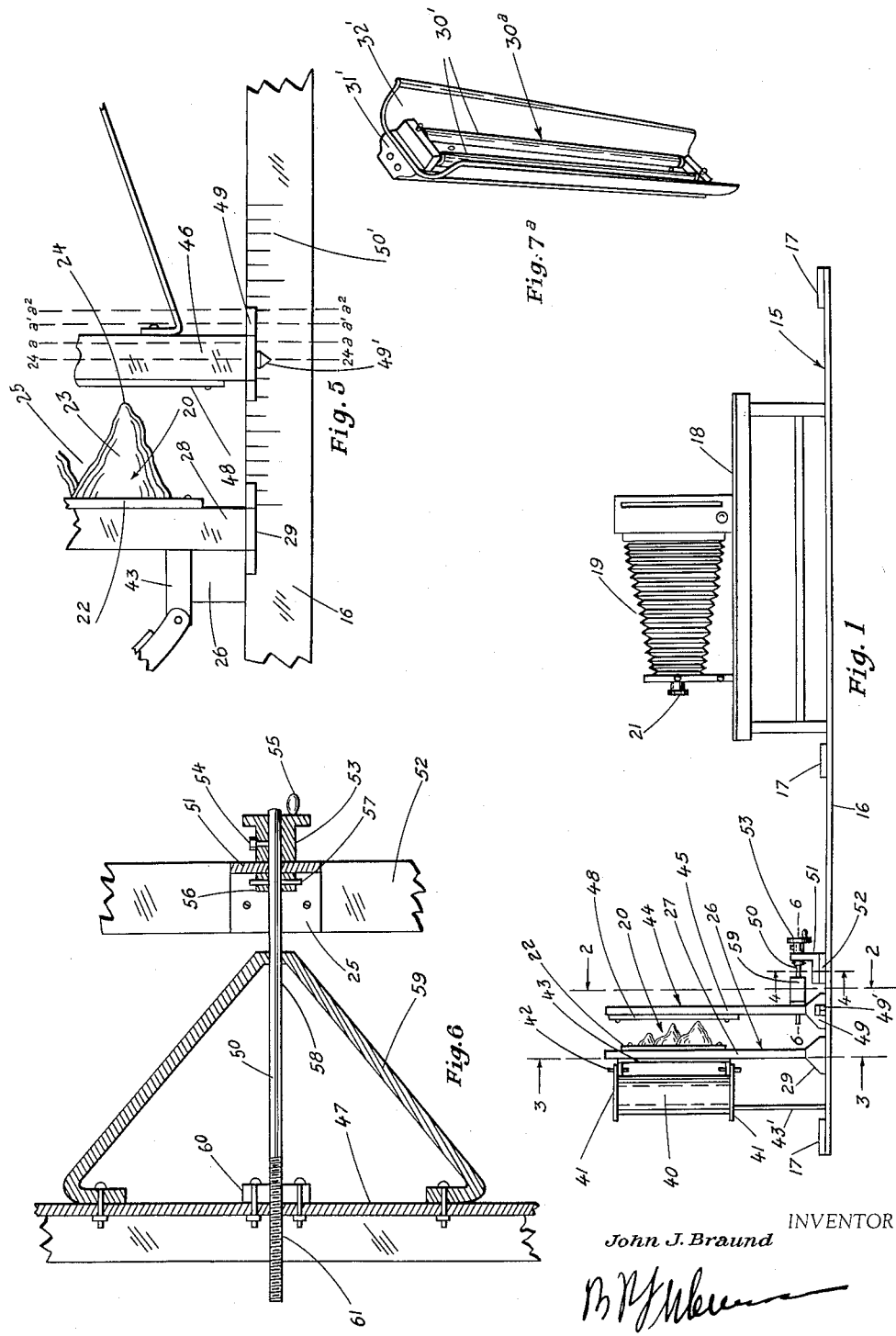
INVENTOR
John J. Braund
BY
ATTORNEY Dec. 13, 1955   J. J. BRAUND   2,726,572
METHOD OF AND APPARATUS FOR PHOTOGRAPHING
Filed Oct. 27, 1952   4 Sheets-Sheet 2
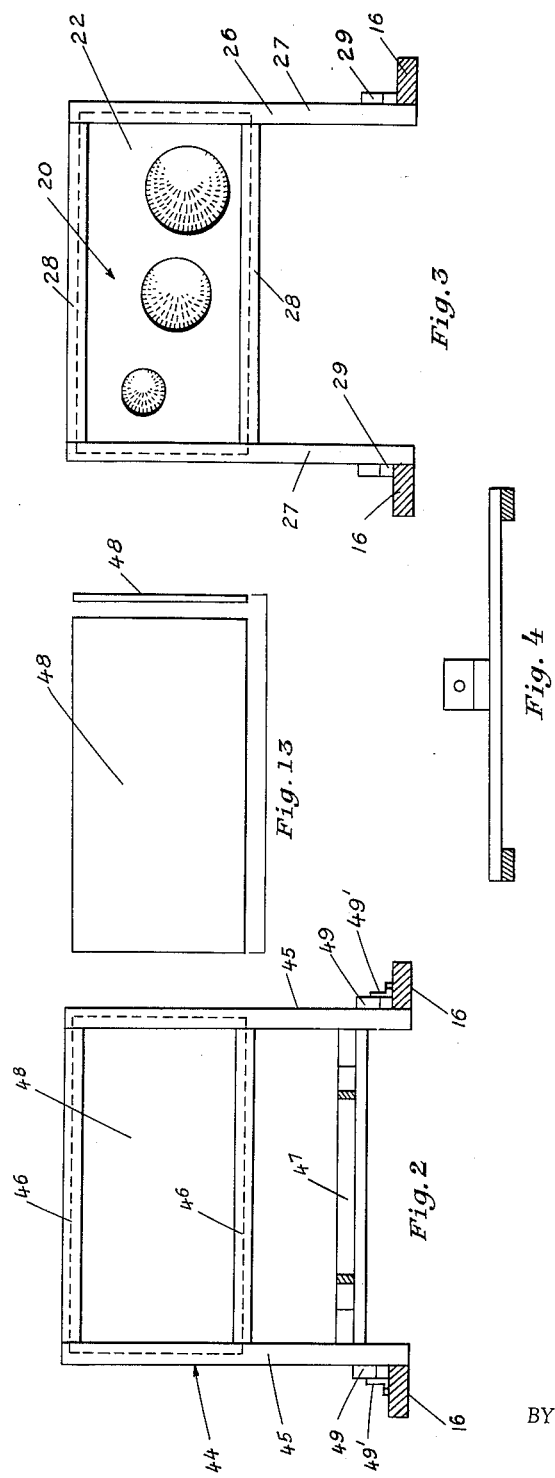
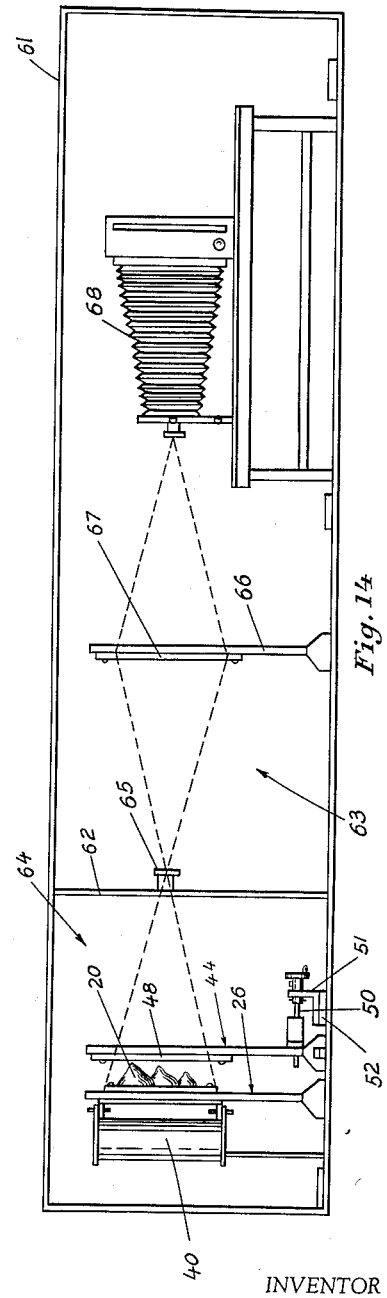
INVENTOR
John J. Braund
BY
ATTORNEY Dec. 13, 1955  J. J. BRAUND  2,726,572
METHOD OF AND APPARATUS FOR PHOTOGRAPHING
Filed Oct. 27, 1952  4 Sheets-Sheet 3
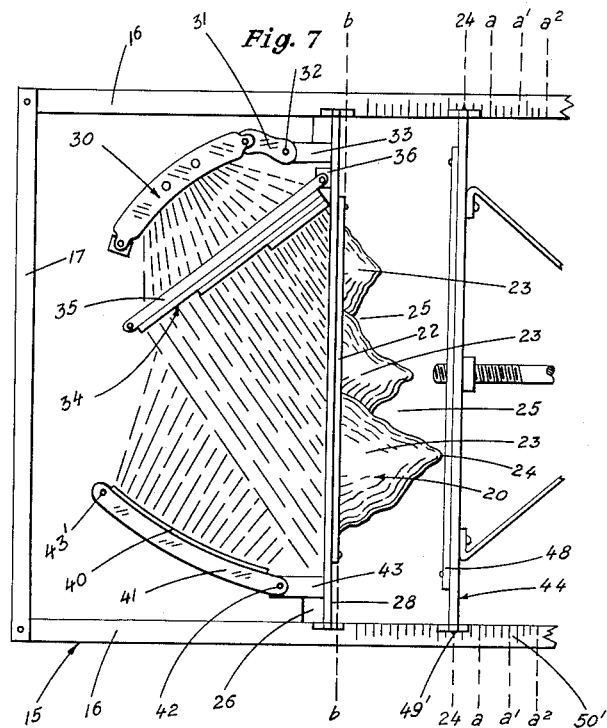
Fig. 7
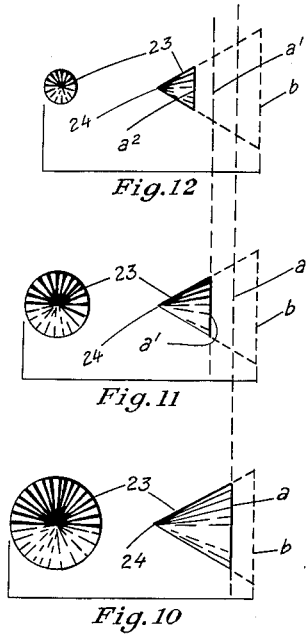
Fig. 12
Fig. 11
Fig. 10
Fig. 9
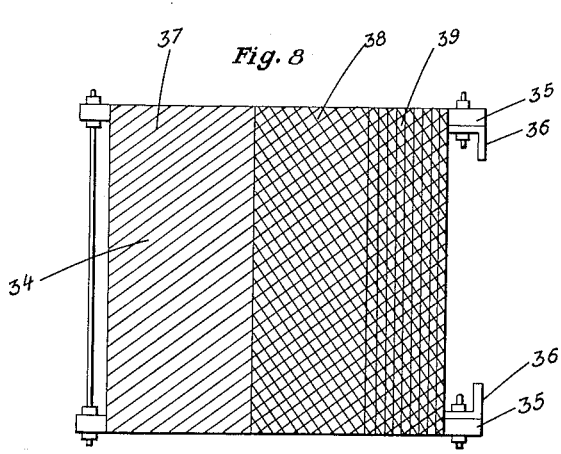
Fig. 8
John J. Braund
INVENTOR
BY
ATTORNEY Dec. 13, 1955 J. J. BRAUND 2,726,572
METHOD OF AND APPARATUS FOR PHOTOGRAPHING
Filed Oct. 27, 1952 4 Sheets-Sheet 4
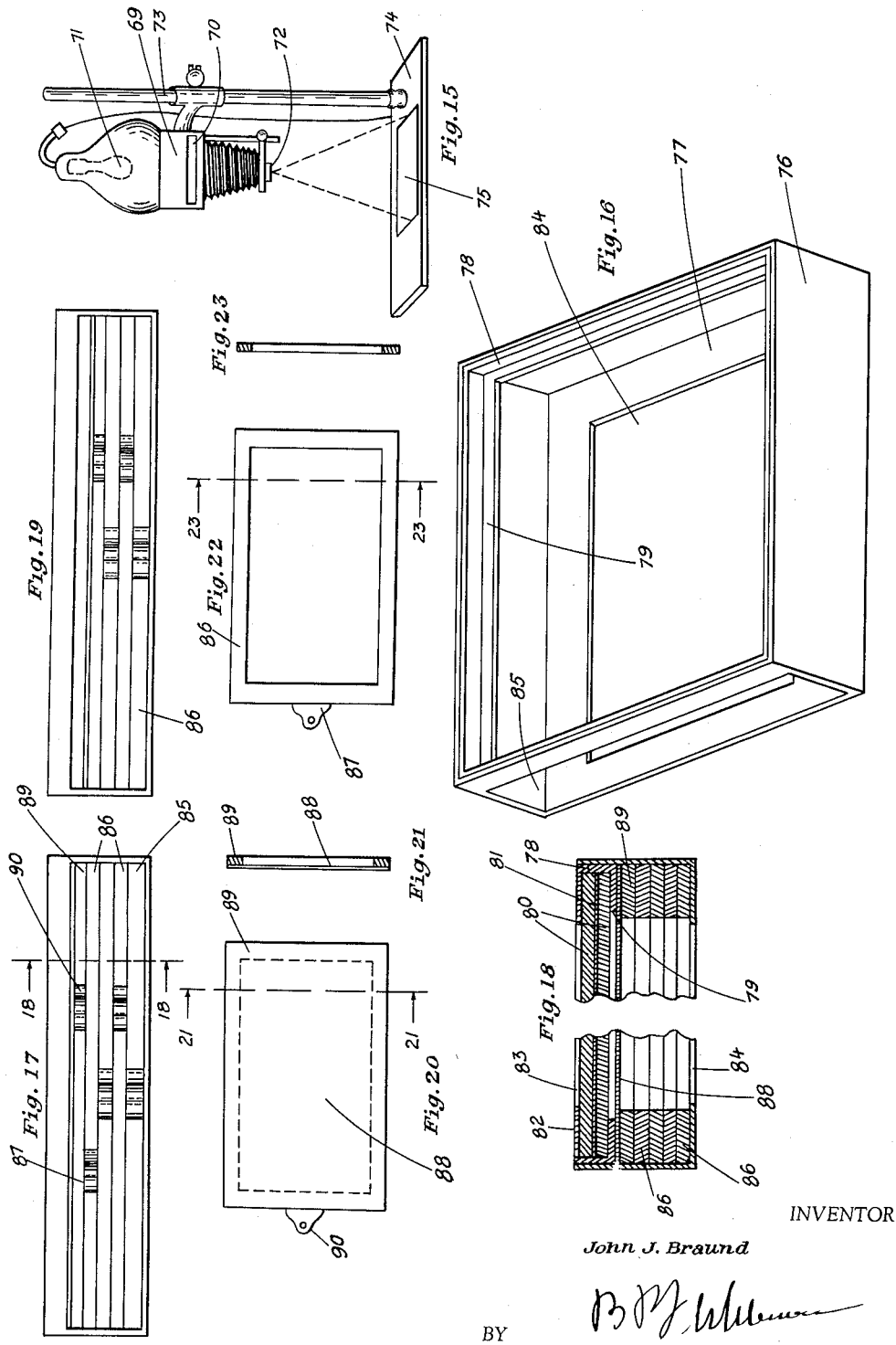
INVENTOR
John J. Braund
BY
ATTORNEY

United States Patent Office 2,726,572
Patented Dec. 13, 1955

2,726,572

METHOD OF AND APPARATUS FOR PHOTOGRAPHING

John J. Braund, Washington, D. C.

Application October 27, 1952, Serial No. 317,059

10 Claims. (Cl. 88—24)

My invention relates to a method of and apparatus for producing a photograph or lithographic print.

An important object of the invention is to provide means for producing a three dimension appearance, or increasing such appearance, in the photograph or lithographic print.

A further object of the invention is to provide a method and means for photographing an object or image, using either back or front lighting of the object or image, and photographing by rays of light passing through a movable diffusing screen.

A further object of the invention is to provide a method and means for photographing a translucent object having three dimension characteristics, by using back lighting, which produces a better control of shadows, and enables the camera to photograph direct light rays instead of reflected light rays.

A further object of the invention is to provide a method and means for producing plates used in lithographic printing.

A further object of the invention is to provide a method and means for copying or enlarging an image formed or photographed upon a flat sheet, for increasing the three dimension appearance in the finished picture, to render portions of the picture more distinct as in vignetting, or to increase the artistic appearance of the copy without impairing its likeness to the object or image.

Other objects and advantages of the invention will be apparent during the course of the following description.

In the accompanying drawings forming a part of this application and in which like numerals are employed to designate like parts throughout same, Figure 1 is a side elevation of apparatus embodying my invention, Figure 2 is a transverse vertical section taken on line 2—2 of Figure 1, looking in the direction of the arrows, Figure 3 is a similar view taken on line 3—3 of Figure 1, looking in the direction of the arrows, Figure 4 is a transverse vertical section taken on line 4—4 of Figure 1, looking in the direction of the arrows, Figure 5 is a fragmentary plan view of the apparatus, showing the parts which support the three dimension object and the shiftable translucent screen, Figure 6 is a horizontal section taken on line 6—6 of Figure 1, Figure 7 is a plan view of the apparatus, parts broken away, showing the lamp, light screen, reflector and associated elements, Figure 7a is a perspective view of the lamp, Figure 8 is a side elevation of the light screen, Figure 9 is a diagrammatic view, showing a raised portion of the three dimension object in end and side elevations, and indicating the extent of photographing, with the shiftable translucent screen removed, Figure 10 is a similar view, showing the extent of photographing of the raised portion when the translucent shiftable screen is arranged in substantial contact with the peak of the raised portion, Figure 11 is a similar view showing the extent of photographing of the raised portion when the translucent screen has been shifted a further distance from the raised portion, Figure 12 is a similar view showing the extent of photographing of the raised portion when the translucent screen has been shifted a further distance from the raised portion, Figure 13 is side and edge elevations of the translucent screen, Figure 14 is a side elevation of apparatus for photographing films for use in a lithographic method, Figure 15 is a perspective view of a photographic copier or enlarger to be used in a dark room, Figure 16 is a perspective view of a casing to be inserted within the photographic enlarger, Figure 17 is a front elevation of the casing and elements therein, Figure 18 is a vertical section taken on line 18—18 of Figure 17, Figure 19 is a front elevation of the casing with one spacing frame removed, Figure 20 is a plan view of the translucent shiftable screen, Figure 21 is a transverse section taken on line 21—21 of Figure 20, Figure 22 is a plan view of one of the removable spacing frames, and, Figure 23 is a transverse section taken on line 23—23 of Figure 22.

In the drawings, the numeral 15 designates a horizontal stationary frame including longitudinal rails 16 connected by transverse strips 17. This frame is supported by any suitable means.

Mounted upon the forward portion of the frame 15 and held stationary thereon by any suitable means is a support or table 18, having a camera 19 mounted thereon.

Means are provided for supporting a three dimension translucent object, to be photographed, in a vertical position and holding the same at a suitable elevation in advance of the camera lens 21. The three dimension translucent object 20 may accurately represent a mountainous section of land. This three dimension translucent object may be formed from white grained translucent plastic material, such as "Vinylite." The object includes a flat sheet 22 upon which the three dimension object is molded or pressed. The object includes raised portions 23 which represent mountains or hills, having peaks 24. The raised portions vary in vertical dimensions. The spaces 25 between the raised portions 23 represent valleys, river beds or the like.

The supporting means for the sheet 22 comprises a vertical frame 26, including vertical sides 27 which are rigidly secured to horizontal bars 28. The lower ends of the vertical sides 27 project downwardly between the rails 16, and have blocks 29 rigidly secured thereto which rest upon the tops of the rails. The frame 26 may be adjusted longitudinally of the frame 15 and located at a selected adjusted position. The sheet 22 extends across the opening of the frame 26, upon its forward side, and is secured to the sides 27 and bars 28 by any suitable means, such as thumbtacks. It is thus seen that the frame 26 will properly support the object 20.

It is preferred that the object be formed from a white grained translucent sheet, so that it may be illuminated at its rear, and the camera will directly photograph the rays of light passing through the translucent object, instead of photographing reflected rays of light, as would be the case if the object was illuminated upon its front face. With this object in view, a source of light or lamp 30ª, Figure 7a, is provided, which is preferably in the form of a fluorescent lamp, including vertically arranged lamps 30′, carried by a support 31′. A horizontally curved reflector 32' is arranged behind the lamps 30' and is mounted upon the support 31'. The support 31' is mounted upon a horizontal arm 30, secured to the top of the support 31' and the arm 30 is pivotally connected with a horizontal link 31, pivoted at 32 to a fixed bracket 33, secured to the frame 26. The arm 30 permits of the horizontal angular adjustment of the lamps 30' and reflector 32'. The lamps 30' being arranged at the rear of the object 20 will project the rays of light upon the rear face of the same.

The rays of light from the lamps 30' first pass through a translucent screen 34, which is suitably mounted upon horizontal arms 35, which are pivotally mounted upon fixed brackets 36, which are attached to the vertical frame 26. The screen 34 can therefore be swung horizontally to angularly adjust the same. The screen 34 comprises a plurality of translucent white grained sheets 37, 38 and 39, formed of "Vinylite" or the like. The sheet 37 extends for the entire horizontal dimension of the screen, while the sheet 38 extends for about two-thirds of the horizontal dimension of the screen and the sheet 39 extends for about one-third of such horizontal dimension. All the sheets extend for the entire vertical dimensions of the screen. It is thus seen that different portions of the screen have different degrees of translucency or offer greater resistance to the passage of the rays of light, and that portion of the screen offering the greatest resistance is arranged next to the right end of the source of light 30ª, since this right end of the source of light is nearest to the object, Figure 7. The other portions of the screen which permit of the passage of a greater amount of rays of light are more remote from the right end of the source of light 30ª. This screen 34 serves to effect an even distribution of light 30 throughout the entire area of the object with respect to the intensity of the light.

Arranged at the rear end of the object is a horizontally curved reflector 40, which is vertical, and is carried by horizontal arms 41, mounted upon pivots 42, secured to fixed brackets 43, in turn secured to the vertical frame 26. A vertical rod 43' may be secured to the outer ends of the arms 40, to aid in supporting these arms. The rays of light which are reflected from the reflector 40 are projected by it upon the rear face of the object or image 20, and the proper distribution of these rays of light can be regulated by the angular adjustment of the reflector 40.

Arranged in advance of the object 20 is a second vertical frame 44, including vertical sides 45 and horizontal bars 46 and 47. The sides 45 and bars 46 form a rectangular frame, the opening of which is covered by a shiftable translucent white flat sheet or screen 48, arranged upon the rear side of the frame next to the object and secured to the frame by thumbtacks or the like. I have found that satisfactory results can be obtained by forming the translucent screen 48 of white grained "Vinylite" of about .008 to .010 inch thick.

The vertical sides 45 extend between the rails 16 and have blocks 49 rigidly secured to the same. These blocks slidably engage the top faces of the rails 16, and the frame 44 is adjustable longitudinally of the rails 16. Each block 49 is provided with a pointer 49', to coact with a scale 50', which is graduated in fractions of an inch, such as one-sixteenth, one-eighth, one-fourth or one-half.

The adjusting means for the frame 44 includes a horizontal shaft 50, having its forward end rotatably mounted within an opening formed in a bracket 51, which is rigidly secured to a transverse bar 52, rigidly secured to the rails 16 at a selected adjusted position. The shaft 50 has a wheel or head 53 rigidly secured thereto by means of a set screw 54 or the like, and this wheel or head is turned by a handle 55. A ring 56 is rigidly secured to the shaft 50 by a pin 57, and this ring is disposed at the rear of the bracket 51. It is thus seen that the shaft 50 may be turned upon its longitudinal axis but is held against longitudinal movement with respect to the bracket 51. The shaft 50 extends through an opening 58 formed in a V-shaped bracket 59 which is rigidly secured to the bar 47. Rigidly secured to this bar 47 is a block 60, having a screw-threaded opening for receiving the screw-threaded portion 61 of the shaft 50. By turning the shaft 50, the bar 47 and its frame 44 will be adjusted longitudinally of the frame 15, and the screen 48 may be arranged different distances from the peaks of the raised portions of the object.

In the practice of the method, the apparatus described is preferably arranged in a dark or semi-dark room, and the translucent three dimension object 20 is illuminated from the rear, by projecting the rays of light upon the same, and arranging the source of light, the screen 34 and reflector 40 at a suitable angle, so that the rays of light are uniformly distributed with respect to intensity, and the shadows from the raised portion will not extend beyond the zero shadow point of the particular raised portion. The camera 19 is arranged in advance of the three dimension object 20 at a suitable focal distance and is not thereafter moved.

With the lamps 30' turned off, a single photographic plate is inserted within the camera and part-time exposures are subsequently made. Assuming that the complete exposure time is two minutes, then the first step is to photograph the three dimension object for a part-time exposure, with the lamps 30' turned on, such as one-half minute. This first part-time exposure is made by opening and closing the shutter of the camera, and the translucent screen 48 is not now mounted upon the frame 44, and the entire object is photographed in focus. Each raised portion is photographed from its peak 24 to the base $b$, Figure 9, at the end of this part-time exposure, the shutter of the camera closes. The translucent grained screen 48 is now mounted upon the frame 44 in front of the object, and the frame 44 is adjusted so that the translucent screen 48 is close to or substantially contacts with the peak or peaks 24 of the raised portions 23. A second part-time exposure is now made, with the lamps 30' turned on, for one-half minute and the object is photographed through the translucent screen 48, and the shutter is closed for completing the second part-time exposure. This second part-time exposure will photograph in focus about three-fourths of the horizontal dimension of the longest raised portion or portions 23, from the peak 24 to a line $a$, Figure 10 and at the end of this part-time exposure, the shutter of the camera is again closed. That portion of the raised portion between the line $a$ and the base $b$ farthest from the screen 48 is subdued or cut out in the photograph since the portion between the lines $a$ and $b$ are out of focus. The screen is now shifted to the second position, and is spaced from the peak 24 of the highest raised portion for about one-sixteenth of an inch and a third part-time exposure is made for one-half minute, by opening and closing the shutter, and the object is photographed through the screen 48. During this third part-time exposure, about one-half of the horizontal length of the highest raised portion 23 is photographed in focus, from the peak 24 to the line $a'$, Figure 11, and the remainder of the raised portion between the line $a'$ and the base $b$ is not photographed in focus since such portion is subdued or cut out by the screen. The screen 48 is now moved to the third position and is spaced from the peak of the highest raised portion for about two-sixteenths of an inch, and a fourth part-time exposure is made for one-half minute by opening and closing the shutter. Only about one-fourth of the horizontal dimension of the highest raised portion 23 is photographed in focus through the screen from the peak 24 to the line $a2$ and that portion of the raised portion between the line $a2$ and base $b$ is not photographed in focus since it is subdued or blocked out by the screen 48. It is thus seen that the first part-time exposure without the screen 48 is indicated in Figure 9, and the highest raised portion and all raised portions are photographed in focus from the peak 24 to the base b; during the second part-time exposure, the highest raised portion is photographed in focus from the peak 24 to the line a; during the third part-time exposure, the highest raised portion is photographed in focus from the peak 24 to the line a'; and during the fourth part-time exposure, the highest raised portion is photographed in focus from the peak 24 to the line a2. The other raised portions being lower will be photographed in focus from the peaks to their bases during the first part-time exposure, since the screen 48 is not in place. During the part-time exposures, through the screen 48, the lower raised portions will have corresponding parts photographed in focus or not photographed in focus, depending upon the distance that such parts are spaced from the screen 48. By virtue of the part-time exposures, with the translucent screen 48 arranged at different distances from each peak 24, it will be found that the print will show different elevations of the raised portions in different shade values, the highest points being darker and the lower points decreasing in darkness toward the base. As shown in Figure 9, the raised portion has been part-time exposure photographed in focus from its peak 24 to the base b. In Figure 10, the raised portion has been part-time photographed in focus between the peak 24 and line a, for two exposures, while the base portion has had one part-time exposure photographing in focus between the line a and line b. That part of the raised portion between the peak 24 and line a is therefore darker than the base portion between lines a and b. In Figure 11, that part of the raised portion between the peak 24 and line a' has had three part-time exposures for photographing in focus, while the base portion between the lines a' and b have been subjected to a shorter part-time exposure photographing. The portions between lines a and b has had one part-time exposure photographing in focus and the portion between lines a and a' has had two part-time exposure photographing in focus and the portion between the peak 24 and the line a' has had three part-time exposure photographing in focus. In Figure 12, that part of the raised portion between the peak 24 and the line a2 has had four part-time exposure photographing in focus. The portion between the lines a2 and a' has had three part-time exposure photographing in focus; the portions between the lines a' and a has had two part-time exposure photographing in focus and the portions between the lines a and b have had one part-time exposure photographing in focus. It is thus seen that the completed photograph will increase in darkness toward the peak of the raised portion. This will provide a photograph of the raised object which will aid the user in determining different elevations of the raised portion of the object.

The distances that the translucent screen 48 is shifted from the object may be varied. I may also vary the order of the photographing of the object by the part-time exposure through the screen 48. The first part-time exposure may be made with the screen 48 spaced the greatest distance from the object, and the other part-time exposures made when the screen is adjusted closer to the object, and the part-time exposure without the screen 48 may be made last.

In Figure 14, I have shown apparatus for photographing negatives for use in making plates in photolithographic printing. In Figure 14, the numeral 61 designates a dark or light proof room having a partition 62 which divides the same into chambers 63 and 64. The partition 62 is opaque and carries a lens 65 which will invert the image projected through the same.

Arranged within the chamber 64 is the same vertical frame 26, shown in Figure 1, carrying the translucent three dimension object, and the object 20 in Figure 14 is inverted with respect to the object or image 20, as shown in Figure 1. The same source of light is disposed at the rear of the object and the same screen 34 and reflector 40, are used. The same shiftable translucent white flat screen 48 is arranged upon the rear side of the frame 26 next to the object and between the object and the lens 65, and the same adjustable means are provided to shift the screen 48 different distances from the object or image.

Arranged within the chamber 63 is a stationary vertical frame 66 having an opening covered by a screen 67 which is translucent and upon which the image is projected. The screen 67 is a flat plate and may be formed of ground glass which is transparent before grinding. The projected image is visible from the opposite side of the translucent screen 67.

A camera 68 is arranged within the chamber 63 at the rear of the projection screen 67, and this camera may be of any well known or preferred type and receives a photographic film upon which the picture is taken.

In the practice of the method in connection with the apparatus shown in Figure 14 and while the translucent screen 48 is removed, the lights are turned on and the image projected upon the screen 67. The film is in the camera and the shutter is now opened and closed for making a full-time exposure of the image projected upon the screen 67, without the screen 48, for about two seconds. This film is now removed from the camera and a new film inserted. The translucent screen 48 is now placed upon its support 44 and is positioned nearest the raised object in substantial contact with the peaks on peaks and when the light is again turned on, the image will be projected through the screen 48 and projected upon the screen 67. While the image is thus projected upon the screen 67, the shutter of the camera is again opened and closed for a complete exposure time of about two seconds and the image projected upon the screen will be photographed upon the second film. The second film is removed from the camera and a new film inserted. The translucent screen 48 is now shifted to the next position from the object and another complete exposure of the film for two seconds is made and the third film is subsequently removed. A new film is again inserted in the camera and the screen 48 shifted a further distance from the object and a complete time exposure of two seconds is made and the fourth film is subsequently removed. The distances that the screen may be shifted from the object may be the same as described in connection with the first form of the invention. The lamps 30' are turned on during the exposure periods and are turned off when the film is removed from and inserted into the camera.

The several films thus separately photographed are developed and used in making lithographic printing plates and these plates may be used for printing in gradations of one color or in individual colors for each plate. Since the object 20 is inverted, the lens 65 is used to provide a positive image projected upon the screen 67, to be photographed by the camera.

Attention is now called to Figures 15 to 23 inclusive, wherein a photographic enlarger is shown, for the practice of the method. In Figure 15, the photographic enlarger comprises generally a casing 69, having an opening or window 70. This device comprises a source of light 71 and a lens 72. The casing 69 is mounted upon a vertical post 73 carried by a horizontal base 74 upon which the sensitized photographic paper 75 is laid.

In accordance with this form of the invention, a rectangular casing 76 is provided of a size to be inserted into the opening or window 70. This casing includes four sides and a bottom 77 and its top is open. A rectangular frame 78 is rigidly mounted within the casing 76 at its top. The sides of the frame 78 are L-shaped in cross-section, Figure 18, providing horizontal webs 79. Arranged within the casing 76 above the frame 78 are two sheets of clear transparent glass 80 having the photographic negative disposed between them, and 82 is a mask having the usual opening 83. The negative serves as the translucent object having the characteristics of three dimensions.

The bottom 77 has a main opening 84 formed therein which is at least as large as the opening in the mask 82, and the front side of the casing has a horizontal opening 85.

Arranged within the casing 76 in superposed relation are a plurality of removable spacing frames 86, having handles 87, projecting to the exterior of the casing 69 and the casing 76 so that the spacing frames may be individually inserted within and removed from the casing 76.

The numeral 88 designates a white translucent movable screen, identical with the screen 48, and the screen 88 is mounted upon a frame 89, having a handle 90. The frame 89 is arranged upon the top of the superposed frames 86.

In accordance with the method, practiced in connection with the apparatus shown in Figures 15 to 23 inclusive, the shutter of the camera is set to provide a proper aperture and the part-time exposures are made by turning the light 71 off and on. In the starting of the method, the translucent screen 88 has not as yet been inserted into the casing 76, and the spacing frames 86 are within the casing 76 in superposed relation and the casing 76 is held within the casing 69. The photographic paper 75 is arranged upon the base at a focal distance from the lens 72 of the camera. The copying device is used in a dark room. The lamp 71 is turned on for two seconds and then turned off to provide a part-time exposure for the photographic paper 75, and such light is projected through the negative or image 81. The screen 88 and its frame 89 are then inserted into the casing 76 above the spacing frames 89, and is held by the spacing frames in the closest relation to the negative or object 80. The photographic paper 75 is again given a part-time exposure of two seconds by turning the light 71 off and on. After the light is turned off, the uppermost spacing frame 86 is removed from the casing 76 and the translucent screen 89 drops to the second or lowered position and is supported by the remaining three spacing frames 86, Figure 19. The photographic paper is again given a part-time exposure by turning the light on for only two seconds. During this exposure, the screen 88 is further from the negative or object 81. The then uppermost spacing frame is removed from the casing 76 and the screen 88 will drop to the next lowered position and spaced from the negative or object for a greater distance. The light is again turned on for two seconds only and the photographic paper 75 is given a further part-time exposure. The next uppermost spacing frame 86 is removed and the screen 88 will drop to the next lowered position and will rest upon the remaining spacing frame. After this, the light 71 is again turned on for two seconds only and the photographic paper 75 is given a further part-time exposure. The last or lowermost spacing frame 86 is now removed and the screen 88 will drop to the lowermost position. The light is again turned on for two seconds only and the photographic paper 75 is given a further part-time exposure.

It is thus seen that all part-time exposures, excepting the first one, are made when the screen 88 is at different distances from the negative or object, in a manner similar to that described in connection with the first form of the invention.

The negative or object 81 has parts which vary in darkness and are defined in different degrees. These portions of the negative or image which are not as dark or definitely defined will be eliminated as the screen 88 is moved farther from the negative or image, while the remaining portions of the negative or image will be photographed. All negatives show the image in some degree of third dimension, but I have found that my method materially increases the third dimension appearance of the photograph as completed. My method further produces a photograph having a highly soft and artistic appearance, and an effect is produced corresponding somewhat to vignetting. A particular advantage of my method is that any number of copies may be made from the same negative or object and the copies will be identical. This permits of experimentation with the time of exposures and the adjustment of the screen 88, which may be recorded, so that the steps may be accurately repeated and identical copies produced. This is impossible with ordinary vignetting.

In photographing the raised object in connection with Figure 1 of the drawings, no photographic device need be arranged between the translucent screen 48 and the camera 19. While it is preferred to illuminate the object from the rear, I also contemplate arranging the lamp or lamps to project the rays of light upon the front face of the object. When this is done, more care must be taken so that the shadows from the peaks of the raised portions will not extend beyond the zero point. The camera will then photograph the illuminated object by reflected light passing through the screen.

It is to be understood that the forms of my apparatuses herewith shown and described are to be taken as preferred examples of the same and that various changes in the shape, size and arrangement of parts may be resorted to without departing from the spirit of my invention or the scope of the subjoined claims, and that changes may be made in the order of the steps of the method without departing from the scope of the claims.

Having thus described my invention, I claim:

1. A method of photographing, comprising holding a three dimension object in position and arranging the long axis of the raised portion of the object in one direction, projecting an image of the three dimension object upon a translucent screen while the object is uncovered, photographing the image projected upon the screen and in the direction of the long axis upon a photographic medium by complete exposure, arranging a translucent screen in close relation to the object and at substantially a right angle to the long axis and between the object and projection screen and projecting an image of the image through the screen near the image upon the projection screen, photographing the image upon the projection screen in the direction of the long axis and upon another photographic medium for full-time exposure, shifting the translucent screen which is close to the object to a position farther from the object, again projecting an image of the object through the adjusted screen upon the translucent projection screen, and again photographing the image upon the projection screen in a direction of the long axis and for a full-time exposure upon a different photographic medium.

2. Apparatus for photographing a raised object, comprising means for supporting the object, a translucent projection screen, means for separating the projection screen and object including a lens through which the image of the object is projected upon the screen, means to illuminate the object, a translucent screen covering the object and arranged between the object and lens, said screen being arranged adjacent to said object and a supporting device for the screen and shiftable to vary the distance between the variable screen and object.

3. In a method of photographing, as a sub-combination, the steps of holding in position an object, illuminating the object, arranging a translucent screen in front of the object so that the rays of light from the illuminated object pass through the screen, moving the translucent screen to different selected distances from the object, and photographing the object by the rays of light passing from the object through the screen when the screen is arranged at each selected different distance from the object.

4. In a method of photographing, as a sub-combination, the steps of holding in position an object having three dimension characteristics, illuminating the object, part-time exposure photographing the object while uncovered by the rays of light passing from the object, arranging a translucent screen in the path of travel of the rays of light from the object and covering the object by such screen, moving the translucent screen to selected positions at different distances from the object, and part-time exposure photographing the object when the screen is arranged at each different selected position by the rays of light from the object passing through the screen.

5. A method of photographing, comprising holding an object having three dimension characteristics, illuminating the object, and photographing said illuminated object, said photographing including part-time exposure photographing the object while it is uncovered upon a film, arranging a translucent screen in position to cover said object and in the path of travel of rays of light passing from the object, moving the screen to selected different distances from the object and part-time exposure photographing the object by the rays of light passing from the object through the translucent screen and when the screen is arranged at each selected position and effecting such part-time exposure photographing upon the same film.

6. A method of photographing, comprising holding a three dimension object in position and arranging the long axis of the raised portion of the object in one direction, illuminating the object, part-time exposure photographing the illuminated uncovered three dimension object in a direction longitudinally of the long axis and upon a film, arranging a translucent screen to cover said object and arranging the same at substantially a right angle to the long axis, moving said screen to selected different distances from the object while maintaining the screen at substantially a right angle to the axis, part-time exposure photographing the object upon the same film with the first part-time exposure photograph by the rays of light from the illuminated object passing through the screen in the direction longitudinally of the long axis when the screen is at each different selected adjusted position, all of said part-time exposure photographs being upon the same film and registering.

7. The method of photographing an object having a raised axis and thereby having three dimension characteristics for producing a print having the appearance of corresponding three dimension characteristics, supporting and holding the object at a fixed focal distance from the single lens of a camera and arranging the raised axis of the object at substantially a right angle to the radial plane of said lens, illuminating the object while thus supported, taking a part-time exposure photographic copy of the object upon a sensitized film through said lens of said camera, then arranging a translucent screen between the object and said single lens, then taking a part-time exposure photographic copy of the object upon the same film through said single lens, shifting the screen to different selected positions to vary the distance between the screen and the object, taking a separate part-time exposure photographic copy upon the same film through said single lens when the screen is shifted to each selected position, causing the separate part-time exposure photographic copies to accurately register uopn the same film so that portions of the photographic copies overlap, the total of said part-time exposures constituting a complete exposure, and then developing the film thus treated.

8. A method of copying a photographic translucent negative, comprising supporting the photographic negative in a selected position, arranging the lens of a copying device at a point forwardly of and spaced from the photographic translucent negative, supporting a photochemically sensitized medium forwardly of and spaced from said lens, projecting light forwardly through the translucent negative and lens upon the sensitized medium for a length of time only sufficient for part-time exposure, arranging a translucent screen between the photographic negative and the lens and at different selected distances from the negative, and then projecting light forwardly through the negative and translucent screen and lens upon said sensitized medium when the screen is at each selected different position and for a length of time only for producing a part-time exposure.

9. A method of copying a photographic translucent negative, comprising supporting the photographic negative in a selected position, arranging the lens of a copying device at a point forwardly of and spaced from the photographic negative, supporting a photochemically sensitized medium forwardly of and spaced from said lens, projecting light forwardly through the translucent negative and lens upon the sensitized medium for a length of time only sufficient for part-time exposure, arranging a translucent screen between the negative and lens, again projecting light forwardly through the negative and translucent screen and lens upon said sensitized medium for a length of time only for producing a part-time exposure, shifting the translucent screen between the photographic negative and the lens and arranging the same at different selected distances from the negative, and then projecting light forwardly through the negative and translucent screen and lens upon said sensitized medium when the screen is at each selected different position for a length of time only for producing a part-time exposure.

10. A photographic copying device comprising a casing, a source of light arranged rearwardly of the casing, a lens arranged forwardly of the casing, means for supporting a photochemically sensitized medium forwardly of and spaced from the lens, means for supporting a photographic translucent negative within the casing between the source of light and the lens, a translucent screen arranged within the casing between the translucent negative and the lens, and spacing members to be arranged within the casing between the translucent screen and the lens, the spacing members serving to hold the translucent screen at different distances from the negative depending upon the number of spacing members then supporting the translucent screen, the spacing members being separately insertable and removable from said casing.

References Cited in the file of this patent

UNITED STATES PATENTS

| | | |
|---|---|---|
| 606,593 | Stender | June 28, 1898 |
| 747,784 | Shannon | Dec. 22, 1903 |
| 1,454,218 | Folmer | May 8, 1923 |
| 1,862,847 | Draper | June 14, 1932 |
| 1,899,139 | Dieterich | Feb. 28, 1933 |
| 2,011,352 | Capstaff | Aug. 13, 1935 |
| 2,063,985 | Coffey | Dec. 15, 1936 |
| 2,159,035 | McGrath | May 23, 1939 |
| 2,244,687 | Goldsmith | June 10, 1941 |
| 2,258,903 | Mitchell | Oct. 14, 1944 |
| 2,424,592 | Terwilliger | July 29, 1947 |